Nov. 4, 1969  F. TEMPLE ET AL  3,476,407
AUTOMATIC RAILWAY AIR HOSE CONNECTOR
Filed July 26, 1967  3 Sheets-Sheet 1

INVENTOR.
FRED TEMPLE
WILLIAM H. RENO
BY
ATTORNEY

INVENTOR.
FRED TEMPLE
WILLIAM H. RENO
BY
ATTORNEY

Nov. 4, 1969    F. TEMPLE ET AL    3,476,407
AUTOMATIC RAILWAY AIR HOSE CONNECTOR
Filed July 26, 1967    3 Sheets-Sheet 3

INVENTOR.
FRED TEMPLE
WILLIAM H. RENO
BY  A. A. Steinmiller
ATTORNEY

United States Patent Office 3,476,407
Patented Nov. 4, 1969

3,476,407
AUTOMATIC RAILWAY AIR HOSE CONNECTOR
Fred Temple, Pittsburgh, and William H. Reno, Monroeville, Pa., assignors to Westinghouse Air Brake Company, Wilmerding, Pa., a corporation of Pennsylvania
Filed July 26, 1967, Ser. No. 656,188
Int. Cl. F16l 55/00, 3/00, 37/00
U.S. Cl. 285—12                                         9 Claims

ABSTRACT OF THE DISCLOSURE

An automatic hose connector for use on railway cars, said hose connector comprising a mating head carrying the connecting end of an air hose and being flexibly supported at one end of a car for automatically mating with a counterpart mating head carried on one end of another car during coupling of the cars, said mating head being removable from its mounting so as to be displaced from a fixed position, in which automatic connection of the mating heads is normally effected, into an accessible position for receiving and being manually connected to a standard manual type air hose.

Background of the invention

With the use of automatic air hose connectors and until such time that all cars are so equipped, it is necessary to provide such automatic hose connectors with means whereby it is possible to connect a car equipped with an automatic hose connector to a car having only the manual type air hose. Since, as is well known by those skilled in the art, the mating head of an automatic air hose connector must be disposed in a substantially fixed position for receiving a counterpart mating head, it is essential that the mating head be arranged so as to be displaceable out of said fixed position and be movable to an appropriate other position in which a manual type air hose may be connected thereto if necessary. Though the mating heads of some of the presently known automatic air hose connectors are so constructed as to enable them to be connected to a manual type air hose, such connectors are either so complex as to be prohibitive in cost, or are so awkward to handle as to make manual connection most difficult, it being necessary in some instances to so distort the manual air hose when making the connection, as to cause the hose to be kinked to such an extent as to restrict the flow of air therethrough.

Summary of the invention

It is the object of the present invention, therefore, to provide a simplified, low-cost automatic air hose connector for railway cars for automatically connecting and disconnecting the respective air hoses between adjacent cars during coupling and uncoupling operations, respectively, said automatic air hose connector being characterized by means whereby the mating head may be readily dislodged from a fixed mounted position (in which connection may be made automatically) so that it may be freely manipulated into a position in which connection with a manual type air hose may be made manually, such uninhibited manipulation thereby enabling the connection to be made free of any undesirable distortion or kinking of the hose which might affect the flow of air therethrough.

The invention comprises an air-hose-carrying mating head removably mounted in a substantially fixed position on a support member fixed to the car coupler of one car, but also being mounted in such manner as to provide sufficient flexibility for permitting adequate displacement from said fixed position when automatically engaging and disengaging a similarly disposed hose-carrying mating head on the coupler of the adjacent car and thereby automatically effecting connection and disconnection of the air hoses during coupling and uncoupling, respectively, of the two cars, said head being secured on said support member by a pin which is quickly removable for permitting the mating head to be freely moved into a position in which a manual type air hose may be connected thereto (if the adjacent car is so equipped rather than with the automatic hose connector) without causing undesirable hose distortion and restriction of air flow therethrough. Flexibility of the support member on which the mating head is carried, is provided by resilient elements disposed in the respective ends of said support member connecting to the car coupler and to the mating head. The hose-carrying mating head is tethered to the support member by suitable means, such as a link chain, of such length as to permit sufficient free movement of the mating head into position for readily making connection with the manual type air hose, while also serving to support the mating head in a suspended position above the road bed after such connection has been made and to take the pull-apart forces between the mating head and the manual air hose during separation when the cars are uncoupled.

The three sheets of drawings accompanying this application consist of the following:

Description and operation

Figure 1:
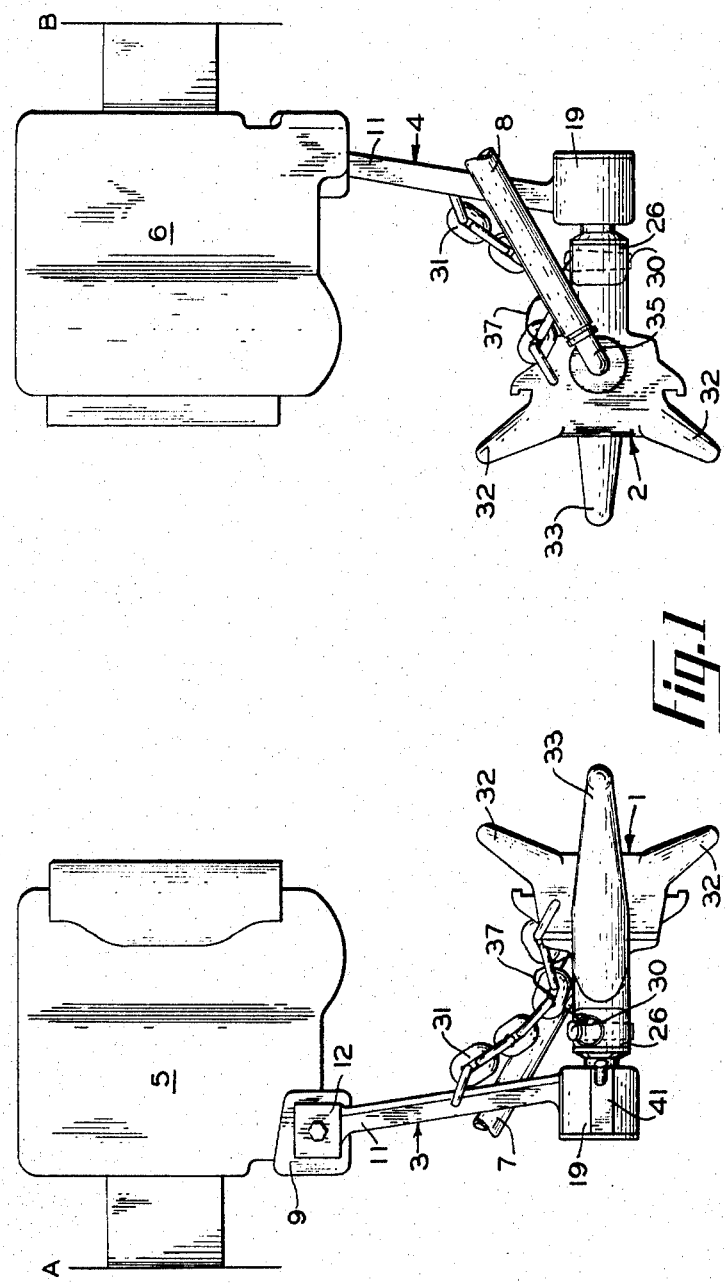
FIG. 1 is an elevational view, in outline, of a pair of disengaged automatic air hose connector mating heads embodying the invention and shown mounted on respective coupler heads of two adjacent cars.

As seen in FIG. 1, an automatic air hose connector embodying the invention herein disclosed comprises a pair of mating heads 1 and 3 supported by support members or hangers 3 and 4 removably secured to car coupler heads 5 and 6 mounted at the ends of railway cars represented by lines A and B, respectively.

The mating heads 1 and 2, which are shown in disengaged disposition in FIG. 1, each have arranged thereon one end of respective air hoses 7 and 8, the other end of said hoses being connected to cut-off cocks (not shown) at the ends of train pipes (not shown) on the cars A and B, respectively.

Figure 4:
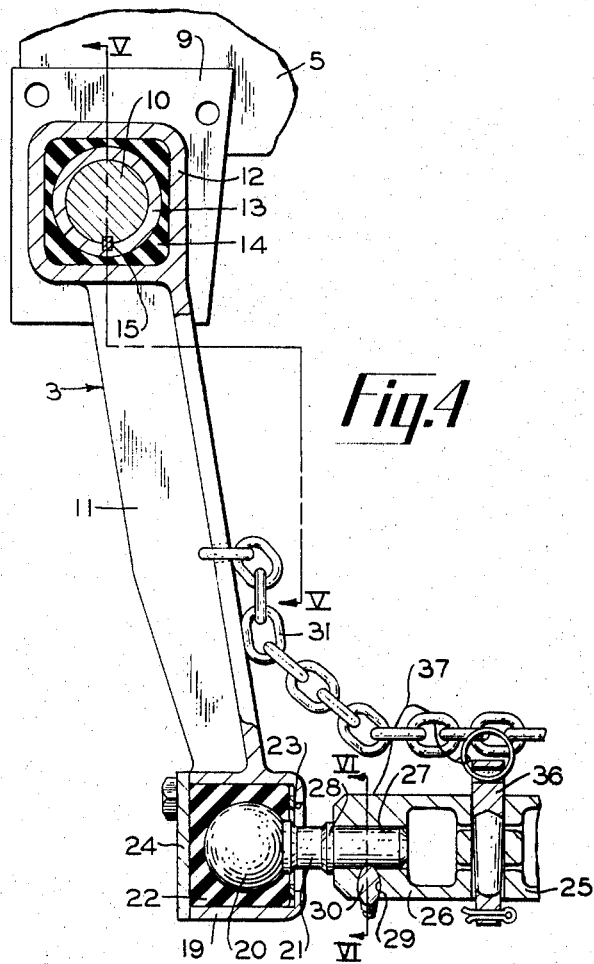
FIG. 4 is an elevational view, on a larger scale than FIG. 3 and mostly in section, of a mating head support member and a portion of the mating head.
Figure 5:
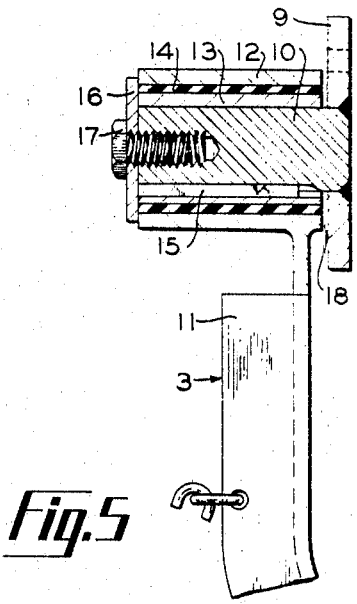
FIG. 5 is an elevational sectional view of the support member taken along line V—V of FIG. 4, as viewed in the direction indicated by the arrows.

Each of the support members or hangers 3 and 4, as may be seen in FIG. 4 particularly, comprises a plate 9 by which the hanger may be fastened to the corresponding vertical side of the coupler head 5 or 6. A pin 10, fixed to the plate 9, extends perpendicularly therefrom to receive one of a shank 11, said end consisting of a substantially square cross-sectional casing portion 12 in which a bushing 13 adapted for a close sliding fit on said pin, is concentrically disposed. A resilient member or cushion 14 composed of a resilient material such as rubber, for example, and having an outer surface contour corresponding to the inner contour of the casing portion 12, is bonded to the outer surface of the bushing 13 so as to be disposed between said bushing and casing portion when the cushion and bushing are assembled therein. The bushing 13 is keyed to the pin 10 by a key 15 to prevent rotation of the hanger 3 relative thereto. As may be seen in FIG. 5, the hanger assemblage is secured to the pin 10 by a cover plate 16 placed over the outer axial extremities of the pin 10, bushing 13, cushion 14 and casing 12, all of which extremities lie in a common plane, and a bolt 17 passing through said cover plate and screwed into the pin. The respective axial lengths of the bushing 13, cushion 14, and casing portion 12, relative to that of the pin 10, are such as to provide a slight clearance, shown at 18 in FIG. 5, to allow such relative movement between the pin and the hanger assemblage as is permitted by the resiliency of said cushion.

The end of shank 11 opposite casing portion 12 has a second substantially square cross-sectional casing portion 19 formed thereon and in which a ball end 20 of a mating head support pin 21 is anchored. The ball end 20 is embedded in a resilient cushion 22 composed of a resilient material such as rubber, for example, which is bonded to said ball end and has an outer surface contour conforming to the inner contour of the casing portion 20. The ball end 20 and the cushion 22 are disposed in the casing portion 19 with the mating head support pin 21 extending through an opening 23 in the casing in a direction away from the end of the car and substantially parallel to the longitudinal axis of the car. A cover plate 24 secured to the open end of casing portion 19 opposite the opening 23 retains the support pin 21 and the cushion 22 in the casing portion.

Figure 6:
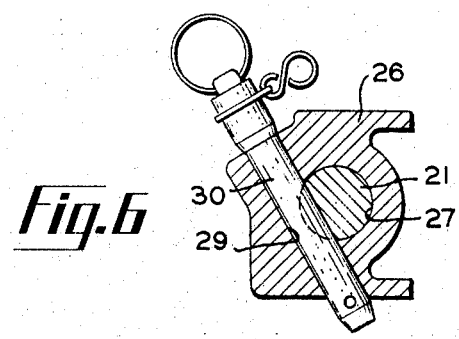
FIG. 6 is an elevational sectional view, on a larger scale than and taken along line VI—VI of FIG. 5, as viewed in the direction indicated by the arrows.

As may be seen more particularly in FIGS. 3, 4 and 6, each of the mating heads 1 or 2 (both being identical in structure, only one will be described in detail) comprises a support frame 25 having formed integrally thereon an axially rearwardly extending mounting portion 26 which has a coaxially disposed bore 27 opening to the rearward end thereof, said bore being adapted for mounting the head on the support member 3 in a fixed axially aligned position parallel to the axis of the car for automatic connecting operation. The mating head 1 (or 2) is mounted on the support member 3 by receiving the support pin 21 in the bore 27 until the open end of the mounting portion 26 abuts against an annular shoulder 28 formed on said support pin, the diametral and axial dimensions of said bore being such as to snugly accommodate said support pin when so disposed. A tapered drill hole 29 extends through the mounting portion 26 perpendicularly to the axis thereof so as to partially intersect the support pin 21 and for receiving a quick-disconnect, complementarily tapered pin 30, said arrangement thus serving to lock the mating head 1 on the support member 3 in the fixed axially aligned position above noted. The drill hole 29 may be disposed at any angle at which the tapered pin 30 may be conveniently removed, but which will not permit said pin to drop out unintentionally. The shank portion 11 of each of the support members 3 and 4 are pre-formed so as to incline in a direction away from the end of the car and inwardly toward the center line of the car whereby the mating heads 1 and 2 are disposed in substantially coinciding axial alignment for automatic connecting operation thereof.

For a purpose to be hereinafter disclosed, tethering means such as a chain 31, for example, of preselected length and strength has one end anchored to the shank portion 11 of the support member 3 while the other end is anchored to the mating head 1 at a suitable locality thereon.

With the exception of the specific mounting means, as above described, for mounting the mating heads 1 and 2 to the respective support members 3 and 4, the remaining portions of said mating heads are identical in structure and manner of operation to the corresponding portions of the automatic mating heads disclosed in United States Patent No. 3,312,481, issued to Fred Temple, one of the applicants in the present application and assigned to the assignee of the present application. Since reference may be had to the aforementioned patent, it is considered sufficient, therefore, to merely state herein that the mating heads 1 and 2, in addition to having the air hoses 7 and 8, respectively connected thereto, are each provided with guide members 32, for guiding the mating heads into coupled relation, and a spring-biased pressure lever 33 for maintaining pressure on and, therefore, the sealing relationship between respective sealing rings 34 (see FIG. 3) after the heads are coupled. The ends of the hoses 7 and 8 adjacent the mating heads 1 and 2 are provided with nipples 35 which are removably secured to the support frames 25 by tapered pins 36, respectively. By simply removing the pin 36, the nipple 35 may be dislodged while a new hose is installed thereon, after which the nipple and pin are replaced. Thus, replacement of worn or broken hoses may be accomplished without uncoupling the mating heads should they be coupled and in service at the time such replacement of a hose is necessary.

The pins 30 and 36 are fastened to each other by a tether 37 intertwined through the chain 31 to prevent misplacement thereof.

Automatic operation of the automatic mating heads 1 and 2 in effecting connection and disconnection of the air hoses 7 and 8 during coupling and uncoupling of the cars A and B, respectively, is similar to and, therefore, fully explained in the aforementioned patent to which reference is available, and such detailed description, therefore, will not be repeated herein since it is not deemed essential to an understanding of this invention. Although the guide members 32 are so designed as to effect proper alignment of the mating heads 1 and 2 during coupling operation, the rubber cushions 14 and 22 in each of the support members 3 and 4 provide sufficient resiliency to permit final alignment for assuring positive sealing contact between the sealing rings 34.

Figure 2:
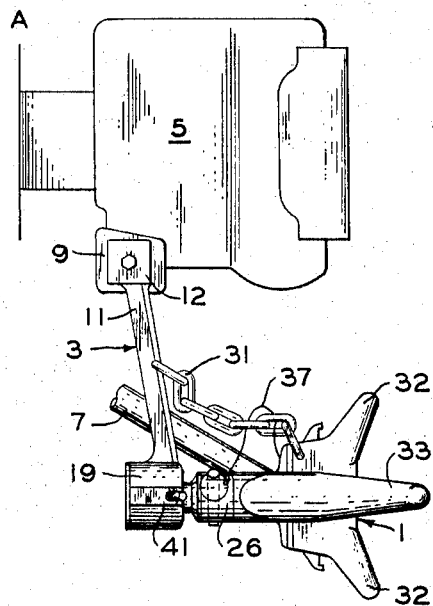
FIG. 2 is an elevational view, in outline and on a smaller scale than FIG. 1, of one of the automatic hose connector mating heads of FIG. 1 and a manual type air hose suspended from an adjacent car.
Figure 2:
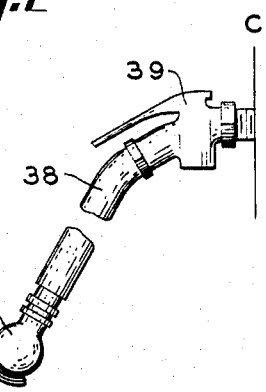

Since all railway cars are not necessarily equipped with automatic air hose connectors, it is desirable to provide means on such automatic hose connectors that would enable a car so equipped to be usable with cars equipped with manually connectable air hoses. In FIG. 2 of the drawings, a railway car represented by the line C is equipped with a standard manual type air hose 38 having one end connected to a cut-off cock 39, the other or free end of said hose being provided with a standard connector 40 by which the hose may be connected manually to an adjacent manual type air hose (not shown) or to an automatic mating head such as the mating head 1, as shown in FIG. 3.

Since the air hoses 7, 8 and 38, as used on railway cars, must be constructed to withstand high pressures (in some instances exceeding 100 p.s.i.), a wide range of temperatures (from sub-freezing to well over 100° F.), and, many times, abusive handling, such air hoses are normally constructed of a heavy resilient material such as rubber having strong reinforcing corded fabric embedded or vulcanized therein and, therefore, are not too flexible but relatively stiff for handling, particularly in colder temperatures. Consequently, manual manipulation of the hoses 7, 8 and 38 is difficult if it is necessary to flex said hoses into position for connection to another hose. Moreover, due to such rigidity or lack of flexibility, the hoses sometimes become kinked when forced or stressed into an unnatural position for making a connection, thus causing a constriction thereof that hinders free flow of air under pressure therethrough.

According to the invention, therefore, means is provided whereby, if it is necessary to make an air hose connection between a car equipped with an automatic connector, such as the mating head 1 on car A, and a car equipped with a manual type hose, such as the hose 38 on car C, the mating head 1 (or the mating head 2) may be removed from the support pin 21 of the support member 3 by simply removing the quick-disconnect pin 30 and sliding the mating head off said support pin. The mating head 1 is then free to be manipulated into the most accessible position for receiving and being connected to the manual hose, such connection being accomplished in the well-known manner used in making a connection between two manual type hoses.

Figure 3:
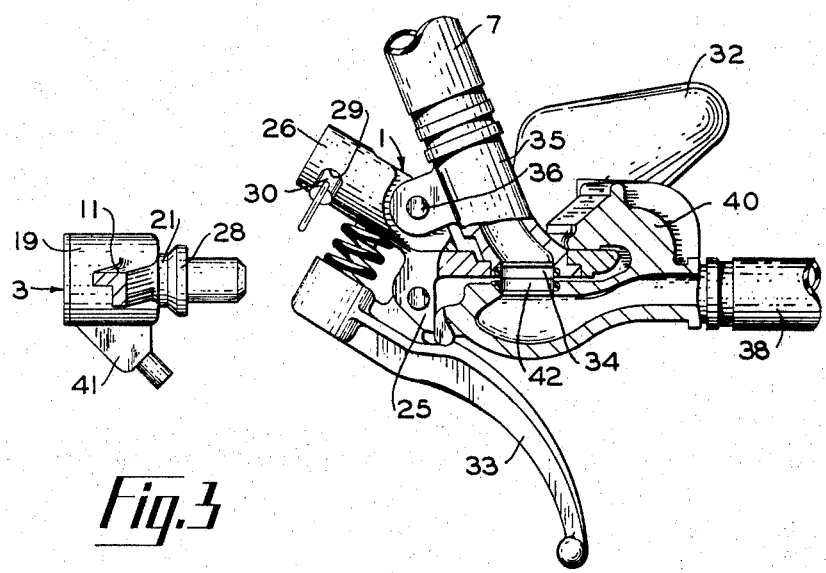
FIG. 3 is a horizontal fragmentary view, on a larger scale than both FIGS. 1 and 2 and mostly in section, of the hose connector mating head and the manual type air hose of FIG. 2 in an engaged relationship; the mating head being removed from normal support on the coupler head.

A horizontally disposed pin-like projection or lug 41, as best seen in FIG. 3, is formed integrally on the casing portion 19 of each of the support members 3 and 4 and is disposed at an angle corresponding substantially to the angle assumed necessarily by the mounting portion 26, relative to the axis of the car, when the mating head is moved into position for connecting it with the manual type hose 38. The projection 41 provides means on which the mating head may be rested temporarily for facilitating in making such manual connection.

The connector 40 and the connector portion of the mating head 1 are of well-known self-locking type, the spring-biased pressure lever 33 being effective for maintaining a sealing relation between a sealing ring 42 on the connector 40 and the sealing ring 34 on the nipple 35. The length of chain 31 is such as to permit sufficient movement of the mating head 1 to an accessible position where connection with the manual hose 38 may be effected, and to support said mating head and the hose, in such connected relation, at the desired height above the road bed, thereby relieving the hoses 7 and 38 from bearing the weight of the mating head.

During uncoupling of the cars A and C, the mating head 1 and the hose 38 are separated automatically without manual manipulation, the stress of such separation being sustained by the chain 31 and the hose 38. When the cars A and C have been completely uncoupled, the mating head 1 is remounted on the support pin 21 and the quick-disconnect pin 30 is replaced on the bore 29. The mating head 1 is thus in position for automatic connection to an adjacent counterpart mating head, such as mating head 2 on car B, or is available for connection to a manual hose, as immediately above described.

Having now described the invention, what we claim as new and desire to secure by Letters Patent is:

1. An automatic air hose connector for railway cars equipped at each end with an automatic car coupler head and an air hose, each of the air hoses having a connecting end connectable to a connecting end of an air hose on an adjacent car, said automatic hose connector comprising, in combination:
    (a) flexible mounting means secured on the coupler head,
    (b) a mating head having the connecting end of an air hose arranged thereon and being carried by said flexible mounting means in a predetermined aligned position for automatic engagement with a similarly arranged mating head and air hose on the adjacent car to cause sealing engagement between the connecting ends of the air hoses, said flexible mounting means positioned intermediate said coupler head and said mating head, and
    (c) manually removable securing means removably securing said mating head on said mounting means in said predetermined aligned position, said mating head being freely movable, upon removal of said securing means, to a different position for manual connection to the connecting end of a manually connectable hose carried on an adjacent car independently of a mating head.

2. An automatic air hose connector, as defined in claim 1, further characterized by tethering means anchored to the mounting means and attached to said mating head for limiting such free movement of the mating head within prescribed bounds and for supporting the mating head when connected to the manually connectable hose.

3. An automatic air hose connector, as defined in claim 1, wherein said flexible mounting means comprises:
    (a) a rigid member,
    (b) means at one end of said rigid member resiliently securing said rigid member to the coupler head, and
    (c) means at the other end of said rigid member resiliently supporting said mating head thereon.

4. An automatic air hose connector, as defined in claim 3, wherein said means at said one end of said rigid member comprises:
    (a) a pin member secured to the coupler head,
    (b) a bushing member slidably received on said pin member and keyed against rotation relative thereto,
    (c) a resilient element coaxially surrounding and bonded to the outer surface of said bushing member, the outer periphery of the cross-sectional area of said resilient member being non-circular in form,
    (d) a hollow casing portion formed integrally at said one end of said rigid member, said casing portion having an inner surface conforming to the outer surface of said resilient element and having said resilient element coaxially disposed therein with a snug fit, and
    (e) means removably securing said hollow casing portion to said pin member in such a manner as to provide flexible relative movement between said rigid member and said pin member to an extent determined by the resilient element.

5. An automatic hose connector, as defined in claim 3, wherein said means at said other end of said rigid member comprises:
    (a) a support member having a pin portion formed at one end on which the mating head is normally mounted in said predetermined aligned position for automatic operation,
    (b) a resilient element bonded to the other end of said support member, the outer periphery of the cross-sectional area of said resilient element being non-circular in form, and
    (c) a hollow casing portion formed integrally at the other end of said rigid member and having an inner surface conforming to the outer surface of said resilient element,
    (d) said resilient element being removably secured in said hollow casing portion with a snug fit to provide flexible relative movement between the said support member and said rigid member to an extent determined by the said resilient element.

6. An automatic air hose connector, as defined in claim 5, wherein said mating head has a recess into which the pin portion of said support member extends, said hose connector being further characterized by a support lug on said casing portion adjacent said other end of said rigid member for insertion into the said recess in the mating head for supporting the mating head when removed from said flexible mounting means and during such time that the mating head is being connected to the manually connectable hose on the adjacent car, said support lug being so positioned as to provide proper disposition of the mating head, when supported thereon, for making connection with the manually connectable hose.

7. An automatic hose connector, as defined in claim 6, wherein said manually removable securing means for said mating head comprises a tapered pin insertable in a complementarily tapered bore transversely intersecting the pin portion of said support member and the recess of said mating head in such manner as to align said mating head in said predetermined aligned position when mounted on said flexible mounting means.

8. An automatic hose connector as defined in claim 3, wherein:
  (a) said means at said one end of said rigid member comprises:
    (i) a pin member secured to the coupler head,
    (ii) a bushing member slidably received on said pin member and keyed against rotation relative thereto,
    (iii) a first resilient element coaxially surrounded and bonded to the outer surface of said bushing member, the outer periphery of the cross-sectional area of said first resilient member being non-circular in form,
    (iv) a first hollow casing portion formed integrally at said one end of said rigid member, said first casing portion having an inner surface conforming to the outer surface of said first resilient element and having said first resilient element coaxially disposed therein with a snug fit, and
    (v) means for removably securing said first hollow casing portion to said pin member in such a manner as to provide flexible relative movement between said rigid member and said pin member to an extent determined by the said first resilient element, and
  (b) said means at the other end of said rigid member comprises:
    (i) a support member having a pin portion formed at one end on which the mating head is normally mounted in said certain aligned position for automatic operation,
    (ii) a second resilient element bonded to the other end of said support member, the outer periphery of the cross-sectional area of said second resilient element being non-circular in form, and
    (iii) a second hollow casing portion formed integrally at said other end of said rigid member and having an inner surface conforming to the outer surface of said second resilient element,
    (iv) said second resilient element being removably secured in said second hollow casing portion with a snug fit to provide flexible relative movement between the said support member and said rigid member to an extent determined by the said second resilient element.

9. An automatic air hose connector, as defined in claim 8, wherein said first and second resilient elements are composed of a rubber material.

References Cited

UNITED STATES PATENTS

| | | | |
|---|---|---|---|
| 1,517,785 | 12/1924 | Kothe | 285—305 X |
| 1,658,264 | 2/1928 | Sutton et al. | 285—305 X |
| 1,819,386 | 8/1931 | Robinson | 285—12 |
| 1,819,387 | 8/1931 | Robinson | 285—12 |
| 1,871,861 | 8/1932 | Rossman. | |
| 3,312,481 | 4/1967 | Temple | 285—63 X |

DAVID J. WILLIAMOWSKY, Primary Examiner

DAVE W. AROLA, Assistant Examiner

U.S. Cl. X.R.

285—63, 305; 287—85